United States Patent [19]

Gellert

[11] Patent Number: 5,429,491
[45] Date of Patent: Jul. 4, 1995

[54] INJECTION MOLDING NOZZLE WITH REMOVABLE COLLAR PORTION

[76] Inventor: Jobst U. Gellert, 7A Prince Street, Georgetown, Ontario, Canada, L7G 2X1

[21] Appl. No.: 278,835

[22] Filed: Jul. 22, 1994

[30] Foreign Application Priority Data

Jun. 30, 1994 [CA] Canada .................................. 2127211

[51] Int. Cl.⁶ .............................................. B29C 45/20
[52] U.S. Cl. ...................................... 425/549; 29/611; 264/328.15; 425/570
[58] Field of Search .................. 425/549, 568, 570; 264/328.15; 29/611

[56] References Cited

U.S. PATENT DOCUMENTS 5,235,737  8/1993  Gellert ................................ 425/549
5,266,023  11/1993  Renwick ............................ 425/549

Primary Examiner—Tim Heitbrink
Attorney, Agent, or Firm—Dalesman & Company

[57] ABSTRACT

An injection molding nozzle with a hollow inner portion and a separate removable outer collar portion which sits on a seat in the mold. The outer collar portion has two separate semicircular segments which extend around and interlock with the inner portion with sufficient strength to prevent longitudinal movement of the inner portion when sealing pressure is applied. A resilient split retaining ring clamps the two semicircular segments together in the interlocking position. In one embodiment, the nozzle has an integral electrical heating element with lead portions which extend radially outward to a ceramic insulator. The ceramic insulator has an inner end portion which is also secured in place in an opening between the two semicircular segments.

10 Claims, 4 Drawing Sheets

INJECTION MOLDING NOZZLE WITH REMOVABLE COLLAR PORTION

BACKGROUND OF THE INVENTION

This invention relates generally to injection molding and more particularly to an injection molding nozzle having a removable outer collar portion.

Injection molding nozzles having a central bore for conveying melt to a gate are well known. Usually these nozzles have an electrical heating element to provide heat for molding thermoplastic materials in a cooled mold. Alternatively they can be cooled for molding thermosetting materials in a heated mold. Each nozzle is seated in an opening in a mold with an outer collar portion having a flange portion which sits against a circular seat in the opening. Previously, as seen in the applicant's U.S. Pat. No. 5,235,737 which issued Aug. 17, 1993, the outer collar portion has been brazed on the rear end of an elongated inner portion to form a one-piece integral nozzle. While this is advantageous for some applications, it has the disadvantages that one-piece integral nozzles are relatively costly to make and the entire nozzle must be discarded if the inner portion becomes worn or malfunctions. Furthermore, inventories of complete nozzles must be maintained to provide a selection of different length nozzles.

SUMMARY OF THE INVENTION

Accordingly, it is an object of the present invention to at least partially overcome the disadvantages of the prior art by providing an injection molding nozzle having an outer collar portion which can be removed from the elongated inner portion.

To this end, in one of its aspects, the invention provides an injection molding nozzle to be seated in an opening in a mold, the nozzle having a rear end, a front end, and a melt channel extending therethrough to convey melt frontwardly toward at least one gate extending through the mold to a cavity, the nozzle having an elongated inner portion and an outer collar portion, the outer collar portion extending around the inner portion adjacent the rear end thereof and having a frontwardly extending flange portion to be received in a seat in the opening in the mold to locate the nozzle, having the improvement wherein the elongated inner portion and the outer collar portion are separate components, the outer collar portion comprises two separate segments which are received around the elongated inner portion in a position interlocked with the elongated inner portion to prevent longitudinal movement of the elongated inner portion relative to the outer collar portion, and retaining means removably retains the two segments of the outer collar portion in the interlocking position around the elongated inner portion.

Further objects and advantages of the invention will appear from the following description taken together with the accompanying drawings.

DETAILED DESCRIPTION OF THE INVENTION

Figure 1:
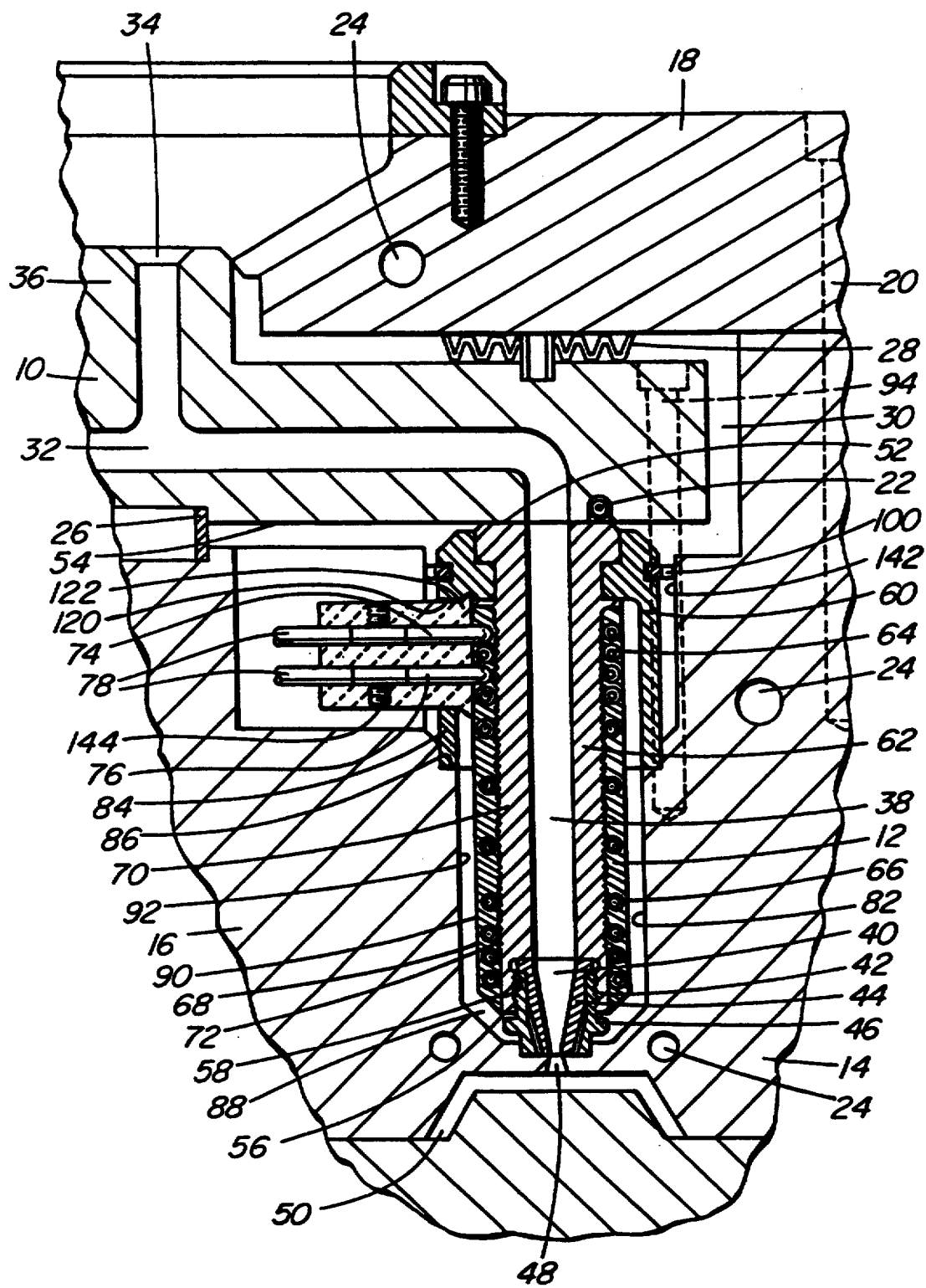
FIG. 1 is a sectional view of a portion of a multi-cavity injection molding system showing a nozzle according to a preferred embodiment of the invention.
Figure 3:
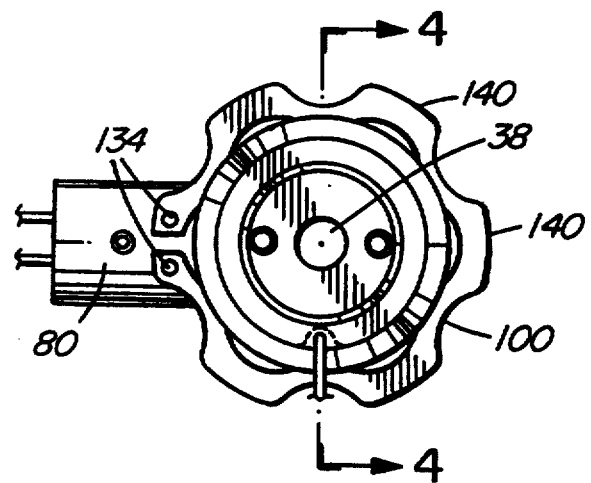
FIG. 3 is a plan view of the same nozzle.

Reference is first made to FIG. 1 which shows a portion of a multi-cavity injection molding system or apparatus having a melt distribution manifold 10 interconnecting several heated nozzles 12 according to the invention in a mold 14. While the mold 14 usually has a greater number of plates depending upon the application, in this case only a cavity plate 16 and back plate 18 which are secured together by bolts 20 are shown for ease of illustration. In this embodiment, the melt distribution manifold 10 is heated by an integral electrical heating element 22 and the mold 14 is cooled by pumping cooling water through cooling conduits 24. The melt distribution manifold 10 is mounted between the cavity plate 16 and the back plate 18 by a central locating ring 26 and a number of insulative and resilient spacer members 28 which provide an insulative air space 30 between the heated manifold 10 and the surrounding mold 14.

A melt passage 32 extends from a central inlet 34 in a cylindrical inlet portion 36 of the manifold 10 and branches outward in the manifold 10 to convey melt through a central melt channel 38 in each of the heated nozzles 12. The melt then flows through an aligned melt duct 40 in a nozzle seal 42 having a hollow inner piece 44 and a threaded outer piece 46 to a sprue gate 48 extending through the cavity plate 16 to a cavity 50.

The rear end 52 of each nozzle 12 abuts against the front face 54 of the melt distribution manifold 10 and the front end 56 has a threaded seat 58 in which the two-piece seal 42 is seated. Each nozzle 12 has an outer collar portion 60 extending around an elongated inner portion 62 through which the central melt channel 38 extends. In this embodiment, the inner portion 62 of the nozzle 12 has an electrical heating element 64 with a helical portion 66 which is cast into a beryllium copper conductive portion 68 around a hot-work steel hollow core 70.

The hollow core 70 is made with a threaded outer surface 72 to ensure the helical portion 66 can be securely cast around it in the beryllium copper conductive portion 68. The helical portion 66 of the heating element 64 extends from a first lead portion 74 along the inner portion 62 of the nozzle 12 and back to a second lead portion 76. The helical portion 66 of the heating element 64 is generally wound with its coils closer together near the rear and front ends 52, 56 of the nozzle 12 where there is more heat loss. The first and second lead portions 74, 76 of the heating element 64 extend outwardly to be connected to lead wires 78 from a power source (not shown) in a ceramic insulator 80. The nozzle 12 is seated in an opening 82 in the mold 14 by a forwardly extending flange portion 84 of the outer collar portion 60 sitting on a circular seat 86 in the opening 82 to provide an insulative air space 88 between the outer surface 90 of the nozzle 12 and the surrounding inner surface 92 of the mold 14. The nozzles 12 are securely retained in this position by bolts 94 extending from the manifold 10 into the cavity plate 16.

Figure 4:
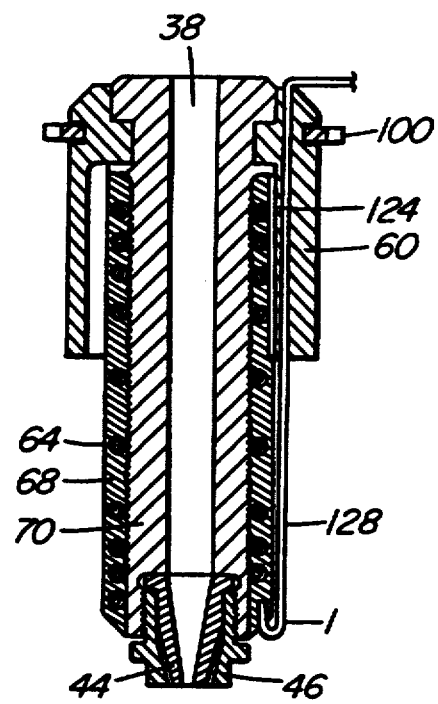
FIG. 4 is a sectional view along line 4—4 in FIG. 3.
Figure 2:
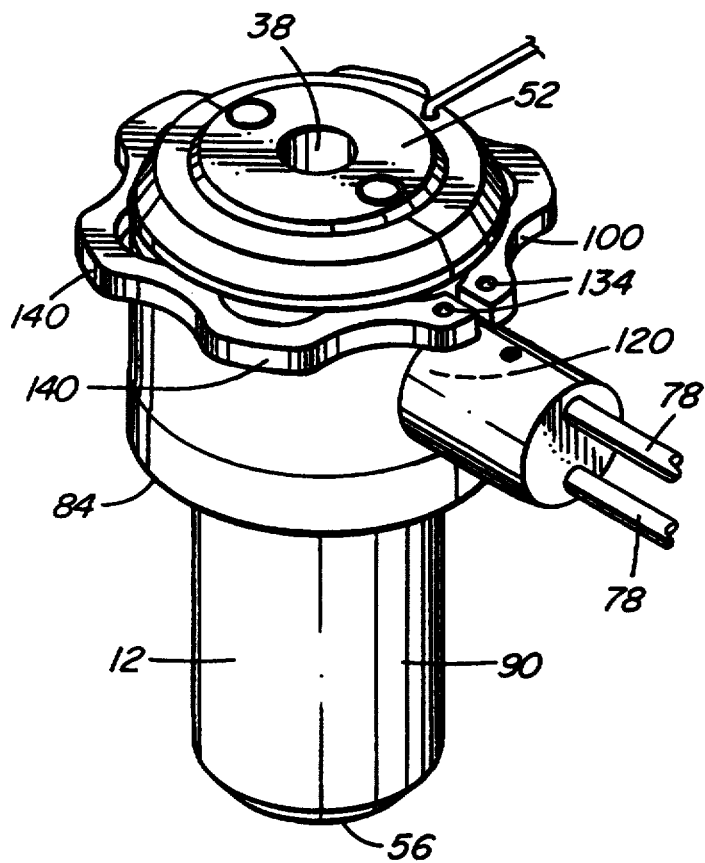
FIG. 2 is an isometric view of a nozzle according to the preferred embodiment of the invention.
Figure 5:
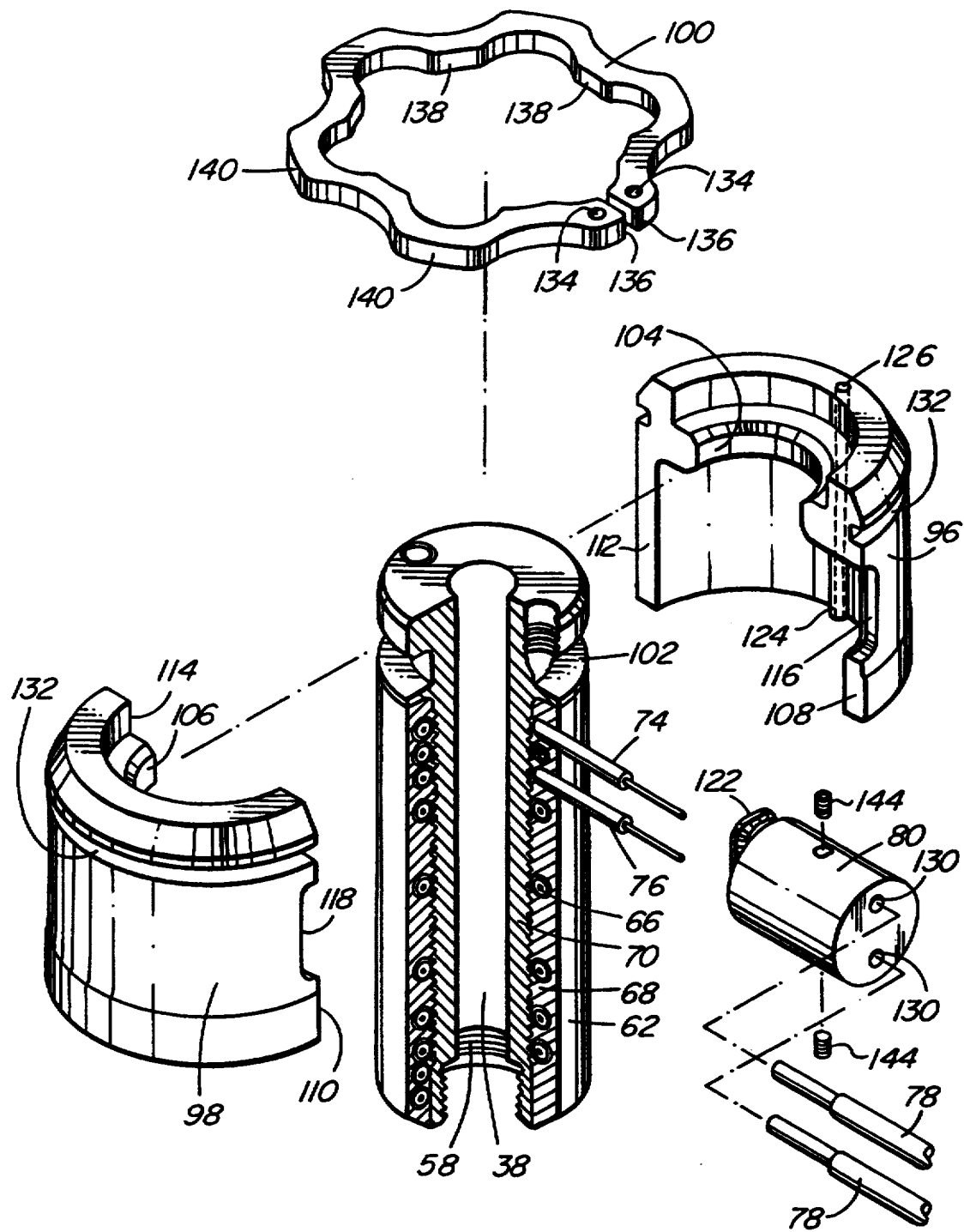
FIG. 5 is an exploded isometric view of the nozzle seen in FIG. 1 showing how it is made.

Reference will now be made particularly to FIG. 5 in describing the nozzle according to the preferred embodiment of the invention and how it is assembled and can be disassembled. As can be seen, the outer collar portion 60 has two separate segments or semicircular halves 96, 98 which together with ceramic insulator 80 are mounted and retained in place on the separate elongated inner portion 62 by a resilient retainer insulating and locating snap ring 100. As described above, the elongated inner portion 62 is made with the helical portion 66 of the heating element 64 cast in a beryllium copper conductive portion 68 around a hot-work steel hollow core 70. In this embodiment, the inner portion 62 has a circular channel 102 with a rectangular cross-section extending therearound adjacent the rear end 52. The semicircular segments 96, 98 of the outer collar portion 60 are made to fit around the inner portion 62 and each have a matching inwardly projecting flange 104, 106 which fit into the circular channel 102 in the inner portion 62 in an interlocking position to prevent longitudinal movement of the elongated inner portion 62 relative to the outer collar portion 60. When they are mounted in this interlocking position adjacent the rear end 52, the semicircular segments 96, 98 have two pairs of ends 108, 110, 112, 114 which abut against each other. One pair of abutting ends 108, 110 of the semicircular halves 96, 98 have matching notches 116, 118 which combine to form a radial opening 120 when the semicircular segments 96, 98 are mounted in place in the interlocking position. The radial opening 120 thus formed between the two semicircular segments 96, 98 is undercut to retainably receive a matching outwardly tapered inner end portion 122 of the ceramic insulator 80. While the two matching semicircular segments 96, 98 are shown as being the same shape and size in this embodiment, the inner surface 122 of one of them has a longitudinally inwardly projecting ridge 124 through which a hole 126 is drilled to receive a thermocouple element 128 to monitor operating temperature, as seen in FIG. 4. While only one segment 96 is shown having a thermocouple element hole 126, one can also be provided in the other segment 98 if it is desirable to have alternate positions for the thermocouple element 128 or to have two thermocouple elements.

The ceramic insulator 80 is first mounted with the outwardly projecting lead portions 74, 76 of the heating element 64 received in a pair of holes 130. The two semicircular segments 96, 98 of the outer collar portion 60 are then mounted around the inner portion 62 with the inwardly projecting flanges 104, 106 received in the channel 102 and the inner end portion 122 of the ceramic insulator securely received in the radial opening 120. The split resilient retainer ring 100 is then mounted in a circular groove 132 extending around the two semicircular segments 96, 98 to clamp them together and securely retain all of the components in place. The split ring 100 has two small holes 134 near the opposite ends 136 to receive retaining ring pliers (not shown) to facilitate its installation and removal. The nozzles 12 are assembled this way prior to shipping to a customer for installation in a mold. If there is damage during shipping to the ceramic insulator 80, it is a simple matter to remove the split ring 100 and replace the insulator 80. In this embodiment, the split ring 100 is made of a springy material such as 17-4-PH stainless steel and has a number of spaced inwardly extending portions 138 and a number of spaced outwardly extending portions 140. Where the nozzles 12 are mounted in the mold 14, as seen in FIG. 1, the inwardly extending portions 138 are seated in the circular groove 132 around the two semicircular segments 96, 98 and the outwardly extending portions 140 abut against the cylindrical shaped inner surface 142 of the mold 14 around the collar portion 60 of the nozzle 12. This accurately locates the rear end 52 of the nozzle 12 in the opening 82 in the mold 14 without undue heat loss through the retaining ring 100 from the heated nozzle 12 to the cooled mold 14. The lead wires 78 from the electrical power source are connected to the lead portions 74, 76 of the heating element 64 by set screws 144 which are tightened into place in the ceramic insulator 80.

In use, after assembly and installation in a mold 14, as shown in FIG. 1, electrical power is applied to the heating element 22 in the manifold 10 and to the heating elements 64 in the nozzles 12 to heat them to a predetermined operating temperature. Pressurized melt is applied from a molding machine (not shown) to the central inlet 34 of the melt passage 32 according to a predetermined cycle. The melt flows through the melt distribution manifold 10, nozzles 12, nozzle seals 42 and gates 48 into the cavities 50. After the cavities 50 are filled and a suitable packing and cooling period has expired, the injection pressure is released and the melt conveying system is decompressed to avoid stringing through the open gates 50. The mold 14 is then opened to eject the molded products. After ejection, the mold 14 is closed and the cycle is repeated continuously with a cycle time dependent upon the size of the cavities 50 and the type of material being molded. As can be seen, the force from the retaining ring 100 interlocks the flanges 104, 106 of the two semicircular segments 96, 98 in the circular channel 102 in the inner portion 62 with sufficient strength to withstand the sealing pressure on the nozzle 12 without any longitudinal movement of the inner portion 62 relative to the outer portion 60 seated on the circular seat 86.

Figure 6:
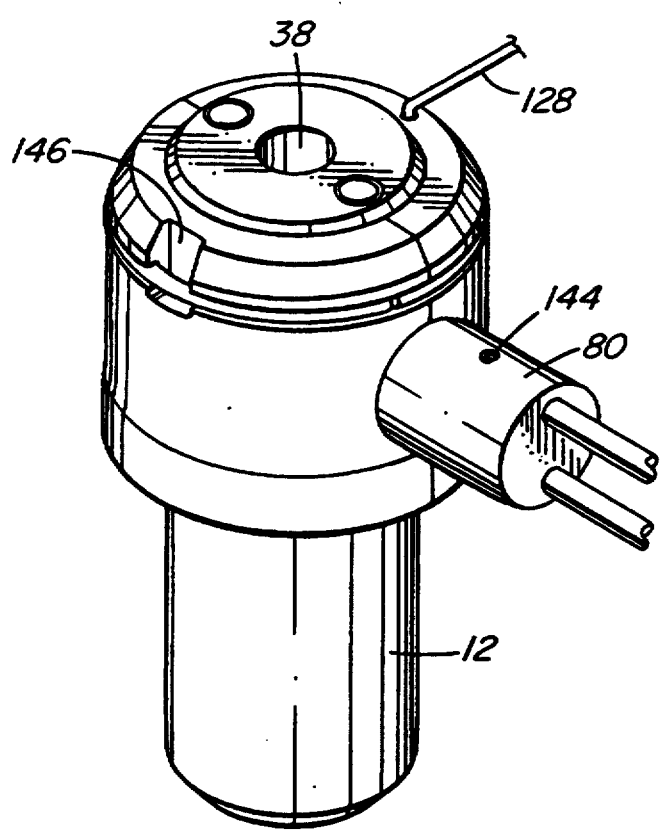
FIG. 6 is an isometric view of a nozzle according to another embodiment of the invention.

Reference is now made to FIG. 6 to describe another embodiment of the invention. As most of the elements are the same as those described above, elements common to different embodiments are described and illustrated using the same reference numerals. In this case, everything is the same except that the retaining ring 100 is simply circular and there is a notch 146 in one of the semicircular segments 96, 98 to provide access for a tool to remove the retaining ring 100.

Figure 7:
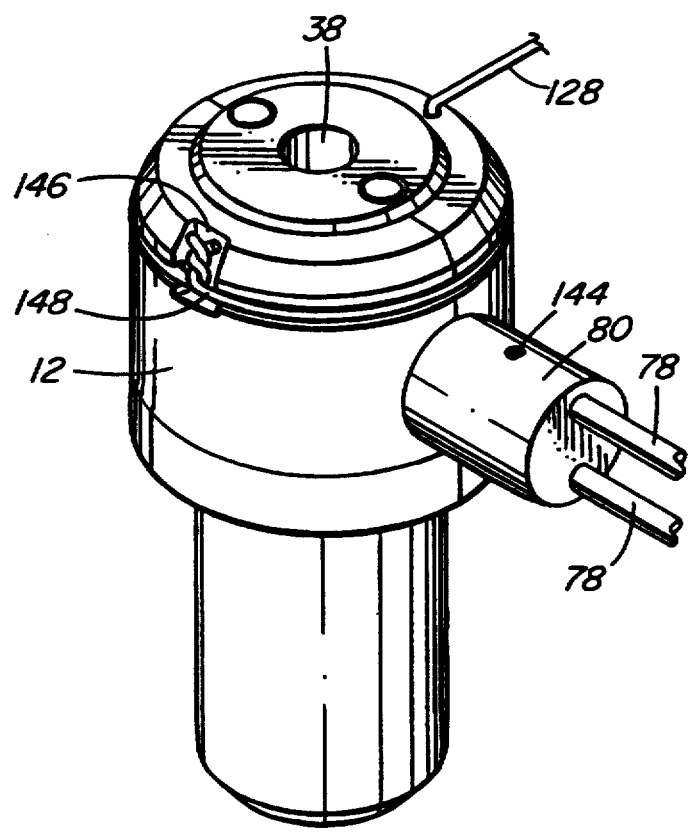
FIG. 7 is an isometric view of a nozzle according to a still further embodiment of the invention.

FIG. 7 shows another embodiment in which a wire 148 is tightened around the two segments 96, 98 to retain them in place rather than using a split retaining ring. However, the nozzle 12 can be easily disassembled by cutting the wire 148, which can be replaced for reassembly of the nozzle 12. In still another embodiment, the two segments 96, 98 of the outer collar portion 60 can be retained together by spot welds which can be pried apart for disassembly.

While the description of the nozzle with the removable collar portion according to the invention has been given with respect to preferred embodiments, it will be evident that various other modifications are possible without departing from the scope of the invention as understood by those skilled in the art and as defined in the following claims. For instance, the nozzle 14 may not have an integral heating element or may be cooled for molding thermosetting materials in a heated mold.

The embodiments of the invention in which an exclusive property or privilege is claimed are defined as follows:

1. In an injection molding nozzle to be seated in an opening in a mold, the nozzle having a rear end, a front end, and a melt channel extending therethrough to convey melt frontwardly toward at least one gate extending through the mold to a cavity, the nozzle having an elongated inner portion and an outer collar portion, the outer collar portion extending around the inner portion adjacent the rear end thereof and having a frontwardly extending flange portion to be received in a seat in the opening in the mold to locate the nozzle, the improvement wherein;

the elongated inner portion and the outer collar portion are separate components, the outer collar portion comprises two separate segments which are received around the elongated inner portion in a position interlocked with the elongated inner portion to prevent longitudinal movement of the elongated inner portion relative to the outer collar portion, and retaining means removably retaining the two segments of the outer collar portion in the interlocking position around the elongated inner portion.

2. An injection molding nozzle as claimed in claim 1 wherein the two segments of the outer collar portion are two matching semicircular halves with pairs of ends which abut together in the interlocking position.

3. An injection molding nozzle as claimed in claim 2 wherein one of the elongated inner portion and the outer collar portion has a circular channel extending therearound and the other of the elongated inner portion and the outer collar portion has a circular flange extending therearound which is seated in the circular channel in the interlocking position.

4. An injection molding nozzle as claimed in claim 3 wherein the circular channel and the circular flange have matching rectangular cross-sections.

5. An injection molding nozzle as claimed in claim 2 wherein the retaining means is a split ring which is resiliently received in a circular groove extending around the two segments of the outer collar portion to clamp the two segments of the outer collar portion together.

6. An injection molding nozzle as claimed in claim 2 wherein the retaining means is a wire secured tightly in a circular groove extending around the two segments of the outer collar portion to clamp the two segments of the outer collar portion together.

7. An injection molding nozzle as claimed in claim 2 wherein the retaining means are spot welds between the two segments of the outer collar which can be split apart for removal.

8. An injection molding nozzle as claimed in claim 2 wherein the elongated inner portion of the nozzle has an electrical heating element with a helical portion extending between two lead portions which extend outwardly through the collar portion of the nozzle into an insulator having an inner end portion, the helical portion of the heating element being cast into a conductive portion around a hollow core, one pair of abutting ends of the two segments of the outer collar portion each have a matching notch which together form a radial opening extending through the outer collar portion in the interlocking position in which the inner end portion of the insulator is securely received.

9. An injection molding nozzle as claimed in claim 8 wherein the inner end portion of the insulator is outwardly tapered and the radial opening through the outer collar portion is undercut to fit around the inner end portion of the insulator to retain the insulator in place in the interlocking position.

10. An injection molding nozzle as claimed in claim 5 wherein the opening in the mold in which the nozzle is to be seated has a generally cylindrical shaped inner surface adjacent the collar portion of the nozzle, and the split ring has a plurality of spaced inwardly extending portions and a plurality of spaced outwardly extending portions, the inwardly extending portions being seated in the circular groove around the two segments of the outer collar portion and the outwardly extending portions to extend into contact with the cylindrical shaped inner surface of the opening in the mold to locate the rear end of the nozzle in the opening in the mold.

* * * * *